United States Patent [19]

Champagne

[11] Patent Number: 5,066,197

[45] Date of Patent: Nov. 19, 1991

[54] HYDRODYNAMIC BEARING PROTECTION SYSTEM AND METHOD

[75] Inventor: John M. Champagne, Seattle, Wash.

[73] Assignee: Sundstrand Corporation, Rockford, Ill.

[21] Appl. No.: 550,506

[22] Filed: Jul. 10, 1990

[51] Int. Cl.$^5$ .............................................. F04D 27/00
[52] U.S. Cl. ........................................ 417/18; 417/32; 417/45; 417/53; 62/505; 384/448; 384/100
[58] Field of Search ...................... 417/18, 20, 32, 45, 417/53; 384/448, 100; 62/505

[56] References Cited

U.S. PATENT DOCUMENTS

| | | | |
|---|---|---|---|
| 3,221,984 | 12/1965 | Ditzler | 230/207 |
| 4,341,093 | 7/1982 | Oishi et al. | 62/505 |
| 4,346,947 | 8/1982 | Nakahara et al. | 384/100 |
| 4,363,216 | 12/1982 | Bronicki | 60/657 |
| 4,484,454 | 11/1984 | Sugiyama | 62/505 |
| 4,598,556 | 7/1986 | Mokadam | 62/117 |
| 4,721,399 | 1/1988 | Grosskurth et al. | 384/448 |
| 4,809,521 | 3/1989 | Mokadam | 62/498 |

FOREIGN PATENT DOCUMENTS 0235723  9/1988  Japan ................................. 384/100

OTHER PUBLICATIONS

"A New Technology in Energy-Efficient Electrically Driven Aircraft Environmental Control Systems", authored by W. Cloud, J. McNamara and David B. Wigmore, presented at the 21st IECEC Conference, Aug. 25-29, 1986, Article #869390 American Chemical Society, pp. 1696-1702.

Primary Examiner—Richard A. Bertsch
Assistant Examiner—David W. Scheuermann
Attorney, Agent, or Firm—Antonelli, Terry, Stout & Kraus

[57] ABSTRACT

A protection system for a rotatable element (20) which is rotatably supported by hydrodynamic bearings (22, 24) pressurized with a lubricating fluid provided from a pressure source (26 and/or 34) with the fluid being subject to a change in state from liquid to vapor when heat from the bearings during rotation of the rotatable element is absorbed by the pressurized fluid during supporting of the rotatable element in accordance with the invention includes a pressure sensor (302) in fluid communication with fluid flowing from the hydrodynamic bearings for producing a pressure signal representative of pressure of the fluid flowing from the bearings; a temperature sensor (304) in fluid communication with the fluid flowing from the hydrodynamic bearings from producing a temperature signal representative of temperature of the fluid flowing from the bearings; a prime mover (17) for driving the rotatable element with a variable rotational velocity; and a controller (400), responsive to the pressure and temperature signals, for controlling the rotational velocity of the prime mover as a function of the pressure and temperature signals to prevent the change in state of the fluid flowing from the bearings from liquid to vapor.

25 Claims, 4 Drawing Sheets

HYDRODYNAMIC BEARING PROTECTION SYSTEM AND METHOD

CROSS-REFERENCE TO RELATED APPLICATIONS

Reference is made to U.S. Pat. application Ser. No. 550,544 entitled "Bearing Pump Control for Lubricating Hydrodynamic Compressor Bearings" filed on even date herewith, which is assigned to the Assignee of the present invention, which application is incorporated by reference in its entirety; and to U.S. Pat. application Ser. No.550,867 entitled "Superheat Sensor With Single Coupling To Fluid Line", filed on even date herewith, which is assigned to the Assignee of the present invention, which application is incorporated herein by reference in its entirety; and to U.S. Pat. application Ser. 550,433 entitled "Vapor Cycle Cooling System Having a Compressor Rotor Supported With Hydrodynamic Compressor Bearings", filed on even date herewith, which is assigned to the Assignee of the present application, which application is incorporated herein by reference in its entirety; and to U.S. Pat. application Ser. No. 550,458 entitled "Speed Control of a Variable Speed Aircraft Vapor Cycle Cooling System Condenser Fan and Compressor and Method of Operation", filed on even date herewith, which is assigned to the Assignee of the present invention, which application is incorporated herein by reference in its entirety; and to U.S. Pat. application Ser. No. 550,434 entitled "Control System For Controlling Surge As a Function of Pressure Oscillations and Method", filed on even date herewith, which is assigned to the Assignee of the present invention, which application is incorporated herein by reference in its entirety; and to U.S. Pat. application Ser. No. 550,432 entitled "Refrigeration System With Oiless Compressor Supported By Hydrodynamic Bearings With Multiple Operation Modes and Method of Operation", filed on even date herewith, which is assigned to the Assignee of the present invention, which application is incorporated herein by reference in its entirety; and to U.S. Pat. application Ser. No. 550,631, entitled "Vapor Cycle System Evaporator Control" filed on even data herewith, which is assigned to the Assignee of the present invention, which application is incorporated herein by reference in its entirety.

DESCRIPTION

1. Technical Field

The present invention relates to refrigeration systems which do not include oil within the refrigerant.

2. Background Art

U.S. Pat. No. 4,598,556, which is assigned to the Assignee of the present invention, discloses a high efficiency refrigeration system in which a non-azeotropic binary refrigerant is used. The disclosed system has a multiple stage compressor. Multiple heat exchangers are provided in series with the refrigeration output from the condenser for cooling the refrigerant prior to expansion by the evaporator.

U.S. Pat. No. 4,809,521, which is assigned to the Assignee of the present invention, discloses a high efficiency cooling system utilizing non-azeotropic binary refrigerant fluid having a single stage compressor. A plurality of heat exchangers are coupled between the output of the condenser and the evaporator for cooling the refrigerant prior to expansion by the evaporator.

An article entitled "A New Technology in Energy-Efficient Electrically Driven Aircraft Environmental Control Systems", authored by W. Cloud, J. McNamara and David B. Wigmore, presented at the 21 st IECEC Conference, Aug. 25-29, 1986, discloses a vapor cycle cooling system for airframes having a multiple stage compressor with multiple subcoolers for controlling the temperature of a non-azeotropic binary refrigerant. The disclosed system does not disclose that the refrigerant may be used to lubricate hydrodynamic bearings supporting the compressor rotor.

U.S. Pat. No. 3,221,984 discloses an oil supply system for a compressor in a refrigeration system. The oil supply system provides pressurized oil to the bearings of the compressor after the compressor motor is deenergized while the compressor is still rotating at high speed. The rotational inertia of the compressor applies pressurized gas from the compressor to an oil tank above the oil level which forces oil to flow to the bearings of the compressor for a period sufficient for the compressor to stop rotating.

DISCLOSURE OF INVENTION

The present invention is a protection system for a rotatable element which is supported by hydrodynamic bearings pressurized with a lubricating fluid provided from a pressure source with the fluid being subject to a change in state from liquid to vapor when heat losses from the bearings during rotation of the rotatable element are absorbed by the pressurized fluid during supporting of the rotatable element and a method of operation. With the invention, the rotational velocity of the rotatable element is controlled as a function of at least one physical characteristic of the fluid to prevent change in state of the fluid flowing through the bearings. In a preferred application, the fluid is a refrigerant which may be a non-azeotropic binary refrigerant and the rotatable element is the rotor of a centrifugal compressor of the refrigerant. The pressure and temperature of the refrigerant flowing from the hydrodynamic bearings is sensed and a controller responsive to the sensed pressure and temperature controls the rotational velocity of a prime mover which preferably is an electric motor as a function of the pressure and temperature to prevent the change in state of the refrigerant flowing through the bearings from liquid to vapor. The controller controls the rotation of the rotor by calculating a bubblepoint temperature of the refrigerant as a function of the pressure of the refrigerant flowing from the bearings, calculating a difference between the bubblepoint temperature and the temperature of the refrigerant flowing from the bearings, calculating a control value equal to the difference between the difference between the bubblepoint temperature and the temperature of the refrigerant flowing from the bearings and a set reference temperature and causing the prime mover to reduce the rotational velocity of the rotor when the control value is less than a set reference temperature. The reduction of rotational velocity may be achieved by either turning off the drive from the prime mover to the rotor or reducing the rotational velocity of the prime mover as a function of a magnitude of the control value. The reduction may be a linear or non-linear function of the magnitude of the control value with the rotational velocity being zero when the control value is zero or negative and not being reduced when the control value is equal to or greater than the set reference temperature.

The controlled reduction of the rotational velocity of the rotatable element to prevent the lubricant of the hydrodynamic bearings rotatably supporting the bearings from changing state from liquid to gas prevents catastrophic failure of the journals of the high speed rotating element, may increase the life of the rotatable element and increases the ability to monitor the operation of the system in which the rotatable element is contained.

Figure 1:
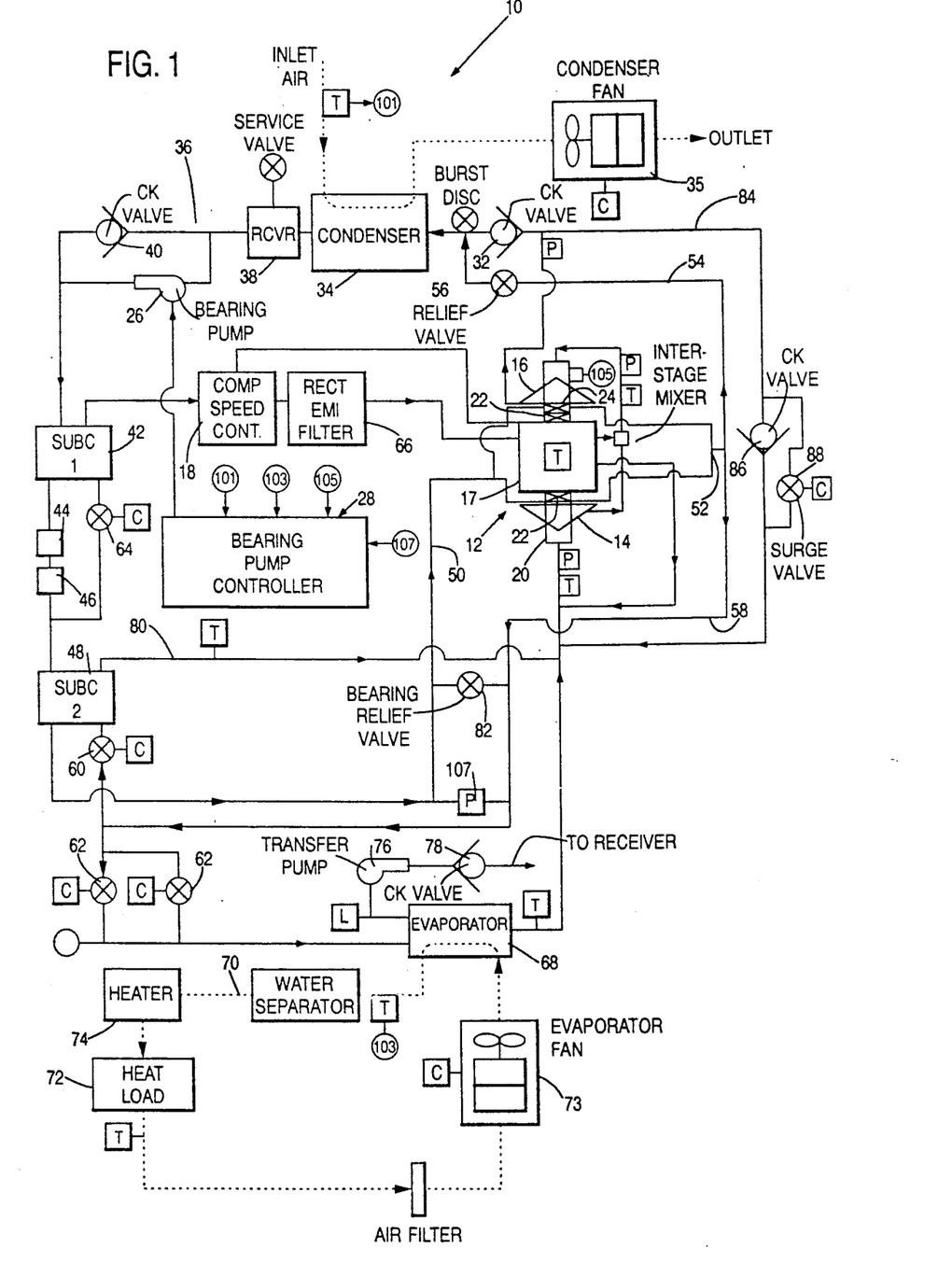
FIG. 1 illustrates a refrigeration system developed by the Assignee of the present invention.

FIG. 1 illustrates a refrigeration system 10 which is disclosed in the aforementioned U.S. Pat. application Ser. No. 550,544 entitled "Bearing Pump Control for Lubricating Hydrodynamic Compressor Bearings" filed on even date herewith and the aforementioned U.S. Pat. application Ser. No. 550,433 entitled "Vapor Cycle Cooling System Having A Compressor Rotor Supported With Hydrodynamic Compressor Bearings", filed on even date herewith. A preferred application of the refrigeration system 10 is cooling avionics contained in an airframe. The refrigeration system employs a non-azeotropic binary refrigeration fluid. A centrifugal compressor 12, comprised of two compressor stages 14 and 16, is driven by a high-speed electrical motor 17 which runs at a rotational velocity of up to 70,000 rpm. The motor 17 is driven by a speed control 18 of the type described in United States U.S. Pat. application Ser. Nos. 319,719, 319,727, and 320,224 which are assigned to the Assignee of the present invention. The rotor 20 on which the compressor stages 14 and 16 are mounted is supported by a pair of hydrodynamic radial bearings 22 and a hydrodynamic thrust bearing 24. A hydrodynamic bearing, which is well known, separates surfaces moving relative to each other with a lubricant which is pressurized from a pressure source. The structure of the hydrodynamic radial and thrust bearings is not illustrated for the reason that it is conventional and does not form part of the present invention.

The hydrodynamic radial and thrust bearings 22 and 24 are maintained by pressurized oiless liquid state refrigerant which is provided from two sources. The first source is from the second stage 16 of the compressor 12 and the second source is from a bearing pump 26 which is activated by a bearing pump controller 28 in accordance with predetermined conditions of operation of the refrigeration system which are based upon sensed operation parameters as described below. The function of the bearing pump 26 is to make up for a deficiency in the pressure and quantity of refrigerant outputted from the second stage 16 of the compressor 12 which is necessary to maintain the hydrodynamic radial and thrust bearings 22 and 24 during predetermined operational conditions of the refrigeration system 10. The bearing pump 26 outputs pressurized refrigerant at a pressure higher than the output pressure of the second stage 16 of the compressor 12 when the bearing pump is activated by the bearing pump controller 28 as described below.

The flow of refrigerant through the refrigeration system 10 is described as follows. Pressure and temperature transducers which are located at various points in the system, are identified by a square box respectively containing the letters "P" and "T". Control signals applied to controllable expansion valves, which are provided from a system controller (not illustrated), are identified by a square box labelled with the letter "C". A square box containing the letter "L" is a liquid level sensor providing a signal to the aforementioned system controller (not illustrated). The connections of the liquid level sensor and pressure and temperature transducers to the system controller (not illustrated) have been omitted. Pressurized refrigerant flows from the second stage 16 of the compressor 12 through check valve 32 to condenser 34 at which the pressurized refrigerant gas is condensed to liquid. A first heat exchange fluid, which in this application is air, flows in a counterflow direction through the condenser 34 under suction created by a condenser fan 35 to remove heat from the refrigerant and cause the refrigerant to condense to liquid. The refrigerant is outputted by the condenser 34 to a refrigerant circuit 36 which couples the condenser to the radial and thrust hydrodynamic bearings 22 and 24 through a flow path including receiver 38, check valve 40, a first subcooler 42, filter drier 44, sight glass 46, a second subcooler 48 and from the output of the second subcooler 48 through line 50 to the input of the radial and thrust hydrodynamic bearings 22 and 24. The liquid refrigerant discharged from the radial and hydrodynamic bearings 22 and 24 is combined at point 52. The liquid refrigerant flows from point 52 in a first path 54 when relief valve 56 is open to the input of the condenser 34 and through a second path 58 back to an expansion valve 60, to a pair of parallel connected expansion valves 62. The relief valve 56 is opened when the valves 60 and 62 are closed.

The subcooler 42 functions to cool liquid refrigerant outputted by the receiver 38 to a temperature determined by expansion valve 64 which controls the superheat at the inlet of the second stage 16 of the compressor 12. The expanded refrigerant outputted by the expansion valve 64 cools the liquid refrigerant flowing into the subcooler 42. The liquid refrigerant flowing from the subcooler 42 cools the electronics contained in the compressor speed control 18 and the electronics contained in the rectifier and EMI filter 66 which are components used for driving the electrical motor 17.

The expansion valves 60 and 62 perform different functions. The expansion valve 60 controls the superheat at the output of the subcooler 48. The expansion valves 62 may perform one of two functions. The first function is the controlling of the superheat out of the evaporator 68 which cools air flowing in a direction counter to the flow of refrigerant through the evaporator in an airflow path 70 which cools an avionics heat load 72. The second function is the control of the air temperature out of the evaporator. Only one function may be performed at a time. Fan 73 provides the pressure head to cause air to circulate in the airflow path 70. Optionally, a heater 74, which may have multiple stages, may be provided in the air path 70 when cooling of the heat load 72 which may be avionics is not necessary. The evaporator 68 is coupled to the receiver through a transfer pump 76 and a check valve 78.

A function of the second subcooler 48 is to lower the temperature of liquid refrigerant flowing out of the first subcooler 42 to a temperature at which the refrigerant will maintain a liquid state flowing through the hydrodynamic radial and thrust bearings 22 and 24 after absorbing heat therein. The cold side output 80 from the second subcooler 48 combines with the refrigerant flow to the first stage 14 of the compressor 12. The output from the evaporator 68 also supplies the input to the first stage 14 of the compressor.

A bearing relief valve 82 bypasses the hydrodynamic radial and thrust bearings 22 and 24 when the pressure across the bearings reaches a predetermined maximum pressure, such as 50 psi, to avoid dropping excessive pressure across the hydrodynamic radial and thrust bearings 22 and 24 which may damage the bearings. A ΔP pressure transducer 107 senses when the pressure drop across the radial and thrust bearings 22 and 24 is less than 18 psi. The function of ΔP pressure transducer 107 is described below in conjunction with FIG. 2.

The output from the second stage 16 of the compressor 12 also flows through a fluid circuit 84 which contains a parallel connection of a check valve 86 and a surge valve 88. The surge valve 88 permits recirculation of refrigerant from the output stage 16 back to the input stage 14 of the compressor 12 during surge conditions in a manner which is known.

As stated above, the function of the bearing pump 26 is to provide supplemental pressurized refrigerant to the hydrodynamic radial and thrust bearings 22 and 24 under conditions of operation of the compressor 12 where the output pressure from the second stage 16 is insufficient to maintain the necessary minimum pressure and flow rate to the hydrodynamic radial and thrust bearings such as a start condition. The bearing pump controller 28 activates the bearing pump 26 in accordance with predetermined conditions of operation of the refrigeration system 10 as discussed below in conjunction with FIG. 2. The predetermined conditions are controlled by sensing a plurality of operational parameters of the refrigeration system as discussed below with respect to FIG. 2.

Figure 2:
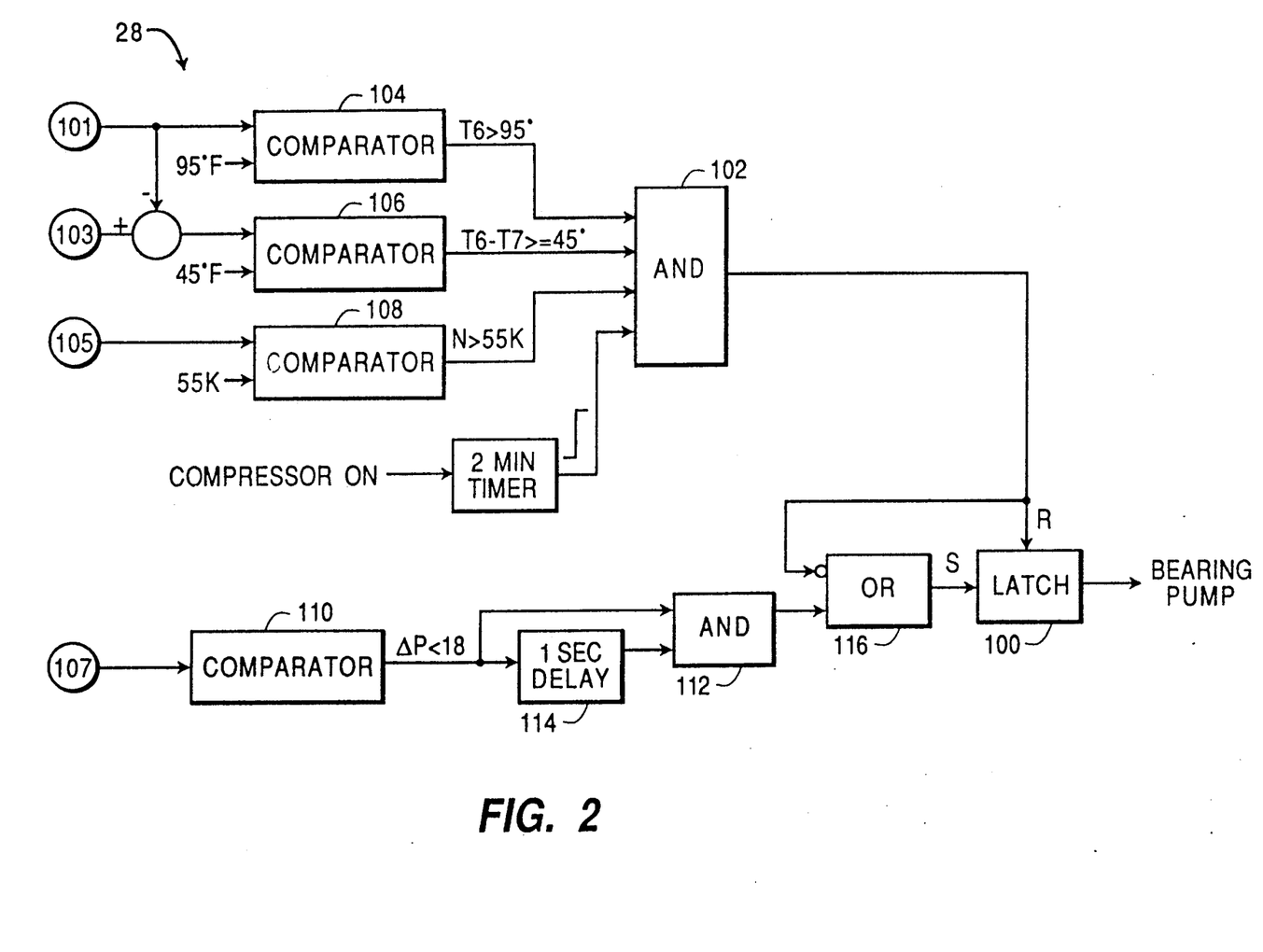
FIG. 2 illustrates a controller for a bearing pump of the system of FIG. 1.

FIG. 2 illustrates a block diagram of a bearing pump controller 28 as illustrated in FIG. 1. The bearing pump controller 28 is responsive to at least one sensor and in a preferred implementation, as illustrated in FIG. 2, is responsive to sensor inputs illustrated in FIG. 1 from a first temperature sensor 101 which senses the temperature of inlet air to the condenser 34, a second temperature sensor 103 which senses the output temperature of air in path 70 from the evaporator 68, speed sensor 105 which senses the rotational speed of the rotor 20 of the compressor 12, and ΔP pressure transducer 107 which senses the pressure drop across the hydrodynamic radial and thrust bearings 22 and 24. The bearing pump 26 is turned on when the output state from latch 100, which may be a conventional flip-flop, is high. The output state of the latch 100 is reset to a low level which causes the bearing pump 26 to turn off when the output from AND gate 102 goes high. The output from AND gate 102 goes high when four predetermined conditions exist concurrently. The first predetermined condition is when the output of comparator 104 goes high which occurs when the temperature sensed by sensor 101 is greater than 95° F. The second predetermined condition is when the output of comparator 106 goes high when the difference between the temperature sensed by the sensor 101 and the sensor 103 is greater than 45°. The third predetermined condition occurs when the output of comparator 108 goes high which occurs when the rotational velocity of the rotor 20 sensed by sensor 105 is greater than 55,000 rpm. The fourth predetermined condition occurs after the overall system has been turned on for a predetermined time interval by activating of the compressor motor 17 under the control of the compressor speed control 18. A fifth predetermined condition which causes the bearing pump to turn on is when the comparator output 110 goes high when the drop sensed by the ΔP pressure transducer 107 is less than 18 psi causing the output of AND gate 112 to go high after a debounce delay period of one second due to the one second delay 114 delaying the comparator 110 output for one second if the output of the comparator is high for at least one second. The output of AND gate 112 is applied to a first input of OR gate 116 which has a second input which is an inversion of the output of AND gate 102. The output of the OR gate sets the latch 100 causing the bearing pump 26 to be activated when anyone of the aforementioned five predetermined conditions occurs. When the output of the AND gate 112 is low, the latch 100 is set as a consequence of the second input to the OR gate 116 being an inversion of the output of the AND gate 102. As a result, if any one of the outputs from the comparators 104-110 is low or the compressor motor has not been on for more than two minutes, the output of the latch 100 will be high which causes the bearing pump 26 to apply an increased flow rate of higher pressure refrigerant to the refrigerant circuit 36.

While FIG. 2 illustrates a preferred bearing pump controller 28 to be utilized in the refrigeration system of FIG. 1, it should be understood that other operational parameters of the refrigeration system may be sensed for controlling the operation of the bearing pump 26 and other predetermined conditions of operation may be utilized for activating the bearing pump such as when it is desired to cool the avionics 72 without operating of the compressor.

A method of operating the refrigeration system of FIGS. 1 and 2 comprises applying pressurized refrigerant to the hydrodynamic radial and thrust bearings 22 and 24 flowing from the compressor 34 during operation of the refrigeration system 10 and providing supplemental pressurized refrigerant from the bearing pump 26 to the hydrodynamic bearings at a pressure higher than a pressure of refrigerant provided by the compressor 12 in accordance with predetermined conditions of operation of the refrigeration system. One of the predetermined conditions is a temperature of the air flowing through the condenser 34 sensed by a first temperature sensor 101 which is coupled to the controller 28 is less than a set temperature which, as illustrated in FIG. 2, is 95° F. Another of the predetermined conditions is a temperature difference between the air flowing through the condenser 34 and the air flowing through the evaporator 68 sensed respectively by the first and second temperature sensors 101 and 103 is less than a set temperature which is illustrated in FIG. 2 as 45° F. Another of the predetermined conditions is that the refrigeration system 10 has been turned on for less than two minutes. Another of the predetermined conditions is that a pressure drop across the hydrodynamic bearings 22 and 24 sensed by the ΔP pressure transducer 107 coupled to the bearing pump controller 28 is less than a set pressure difference which is illustrated in FIG. 2 as 18 psi. Finally, one of the predetermined conditions is a rotational speed of the turbine rotor 20 sensed by speed sensor 105 coupled to the bearing pump controller 28 sensing a speed of rotation of the rotor 20 is less than a set speed which in FIG. 2 is illustrated as 55,000 rpm.

In a refrigeration system such as that illustrated in FIGS. 1 and 2 using a non-azeotropic binary refrigerant to lubricate hydrodynamic bearings or other low viscosity low boiling point fluids to lubricate hydrodynamic bearings rotatably supporting a high speed rotary element, such as, but not limited to, a rotor of a centrifugal compressor, a change in state of the lubricant of the hydrodynamic bearings to a two-phase fluid caused by the heat generated by the bearings can occur. A phase change from liquid to a mixture of liquid and gas of the lubricant can cause a catastrophic failure of the journals of the high speed rotary element.

No protection system for the hydrodynamic bearings is provided in the refrigeration system of FIGS. 1 and 2. The bubblepoint of the liquid refrigerant at either the inlet or outlet of the hydrodynamic bearings 22 and 24 is not monitored for purposes of reducing either the speed of rotation of the rotor 20 or shutting off the motor drive 18 when the subcooling reaches a state where flashing of the liquid refrigerant is about to or is occurring.

A protection system for a rotatable element which is rotatably supported by hydrodynamic bearings pressurized with a lubricating fluid provided from a pressure source with the fluid being subject to change in state from liquid to vapor when heat from the bearings during rotation of the rotatable element is absorbed by the pressurized fluid during supporting of the rotatable element in accordance with the invention includes a pressure sensor in fluid communication with fluid flowing from the hydrodynamic bearings for producing a pressure signal representative of pressure of the fluid flowing from the bearings; a temperature sensor in fluid communication with fluid flowing from the hydrodynamic bearings for producing a temperature signal representative of temperature of the fluid flowing from the bearings; a prime mover for driving the rotatable element with a variable rotational velocity; and a controller responsive to the pressure and temperature signals, for controlling the rotational velocity of the prime mover as a function of the pressure and temperature signals to prevent the change in state of the fluid flowing through the bearings from liquid to vapor. The rotatable element is a rotor of a centrifugal compressor and the fluid is a refrigerant. The refrigerant may be a non-azeotropic binary refrigerant. The controller controls the rotational velocity by computing a bubblepoint temperature of the refrigerant as a function of the pressure of the refrigerant flowing from the hydrodynamic bearings; calculating a difference between the bubblepoint temperature and the temperature of the refrigerant flowing from the bearings; calculating a control value equal to a difference between the difference between bubblepoint temperature and the temperature of the refrigerant flowing from the bearings and a set reference temperature and causes the prime mover to reduce the rotational velocity of the rotor when the control value is less than a set reference temperature. The prime mover is an electric motor which may be turned off by the controller when the control value is less than a set reference temperature or the velocity may be reduced as a function of the magnitude of the control value as either a linear function or a non-linear function of the magnitude of the control value with the rotational velocity being zero when the control value is zero or negative and not being reduced when the control value is equal to or greater than the set reference temperature.

A method of protecting a rotatable element which is rotatably supported by hydrodynamic bearings pressurized with a lubricating fluid provided from a pressure source with the fluid being subject to change in state from liquid to vapor when heat from the bearings during rotation of the rotatable element is absorbed by the pressurized fluid during supporting of the rotatable element in accordance with the invention includes sensing pressure of the fluid flowing from the hydrodynamic bearings; sensing temperature of the fluid flowing from the hydrodynamic bearings; and controlling a rotational velocity of a prime mover which drives the rotatable element as a function of the sensed pressure and temperature to prevent the change in state of the fluid flowing through the bearings from liquid to vapor. The rotatable element is a rotor of a centrifugal compressor and the fluid is a refrigerant. The refrigerant may be a non-azeotropic binary refrigerant.

The method further includes calculating a bubblepoint temperature of the refrigerant as a function of the pressure of the refrigerant flowing from the bearings; calculating a control value equal to a difference between the bubblepoint temperature and the temperature of the refrigerant flowing from the bearings and a set reference temperature; and reducing the rotational velocity of the rotor when the control value is less than a set reference temperature. The prime mover is an electric motor which is turned off when the control value is less than the set reference temperature or, alternatively, the speed of the prime mover is reduced as a function of the magnitude of the control value in a linear or non-linear manner as a function of the control value.

A protection system for a rotatable element which is rotatably driven by a prime mover and rotatably supported by hydrodynamic bearings pressurized with a lubricating fluid provided from a pressure source with the fluid being subject to change in state from liquid to vapor when heat from the bearings during rotation of the rotatable element is absorbed by the pressurized fluid supporting the rotatable element in accordance with the invention includes at least one sensor for sensing at least one physical characteristic of the lubricating fluid flowing from the hydrodynamic bearings; and a controller, responsive to at least one sensed physical characteristic of the lubricating fluid, for controlling the rotatable velocity of the prime mover as a function of at least one sensed physical characteristic to prevent the change in state of the fluid flowing through the bearings from liquid to vapor. At least one sensor is a pressure sensor and a temperature sensor; the prime mover is an electric motor; the lubricating fluid is a refrigerant; the rotatable element is a motor of a centrifugal compressor; and the rotational velocity of the rotor is controlled as a function of the bubblepoint of the refrigerant flowing from the bearings.

A method of protecting a rotatable element which is rotatably supported by hydrodynamic bearings pressurized with a lubricating fluid provided from a pressure source with the fluid being subject to change in state from liquid to vapor when heat from the bearings during rotation of the rotatable element is absorbed by the pressurized fluid during supporting of the rotatable element in accordance with the invention includes sensing at least one physical characteristic of the fluid flowing from the hydrodynamic bearings; and controlling a rotational velocity of a prime mover which drives the rotatable element as a function of at least one physical characteristic sensed to prevent the change in state of the fluid flowing through the bearings from liquid to vapor. The fluid is a refrigerant, the prime mover is an electric motor and at least one sensed physical characteristic is pressure and temperature of the refrigerant flowing from the bearings.

BEST MODE FOR CARRYING OUT THE INVENTION

Figure 3:
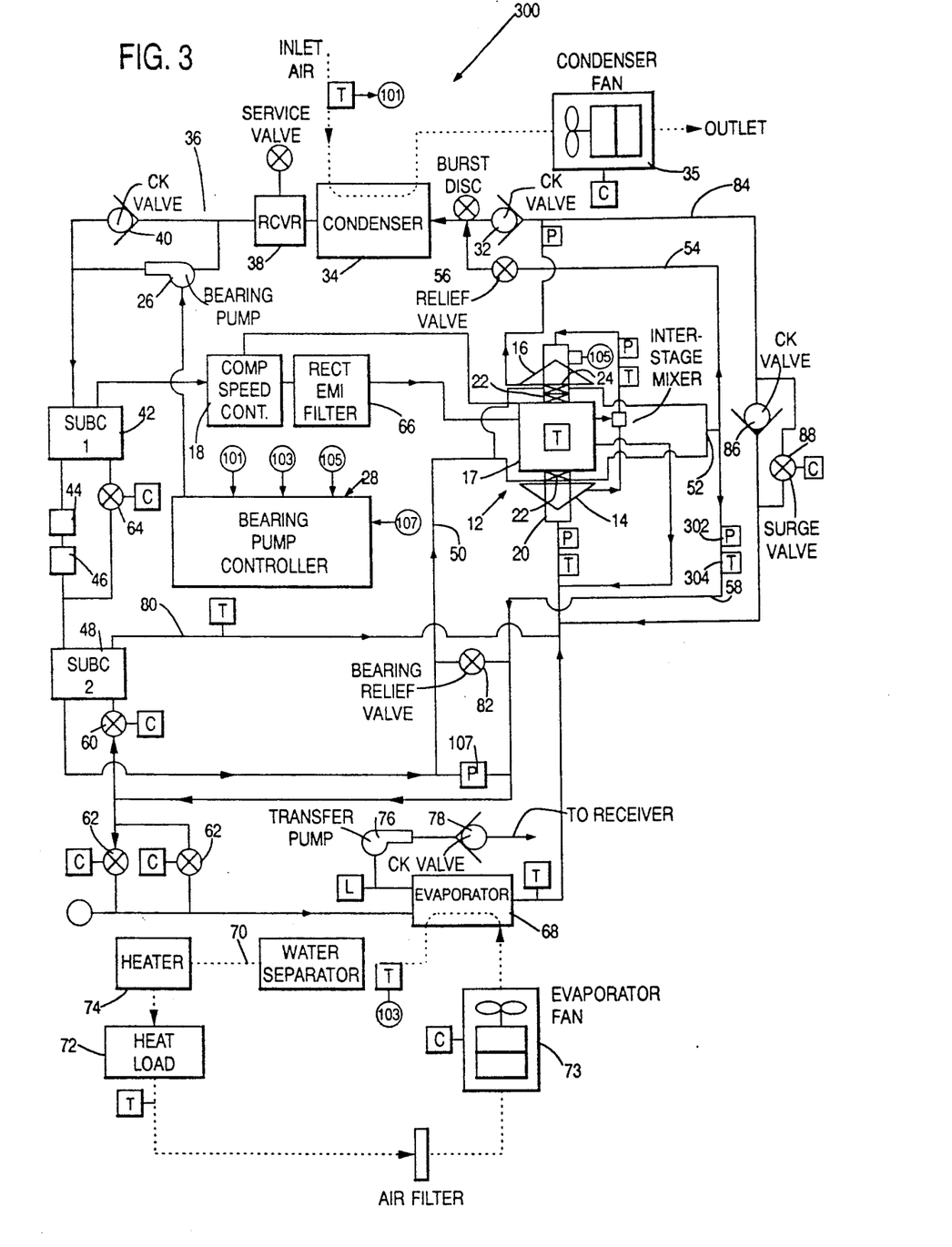
FIG. 3 illustrates a refrigeration system in accordance with the present invention.

FIG. 3 illustrates a preferred embodiment 300 of a protection system for a rotatable element which is a compressor rotor 20 of a centrifugal compressor 12 in a refrigeration system of the type illustrated in FIG. 1. However, it should be understood that the present invention is not limited to application to refrigeration systems with the invention being applicable to protecting rotatable elements which are supported by hydrodynamic bearings with a lubricating fluid which is subject to a change in state from liquid to vapor when heat from the bearings during rotation of the rotatable element is absorbed by the pressurized fluid supporting of the rotatable element. Like reference numerals identify like parts in FIGS. 1-3. It should be understood that the control for the operation of the system 300 is in accordance with FIGS. 1 and 2. The refrigeration system 300 differs from the system 10 of the prior art in that the rotational velocity of the rotor 20 is controlled by the speed control 18 as a function of the pressure and temperature of the refrigerant flowing from the hydrodynamic bearings 22 and 24 to prevent the change in state of the fluid flowing through the bearings from liquid to vapor. The pressure and temperature of the refrigerant flowing from the hydrodynamic bearings 22 and 24 is sensed respectively by sensors 302 and 304.

Figure 4:
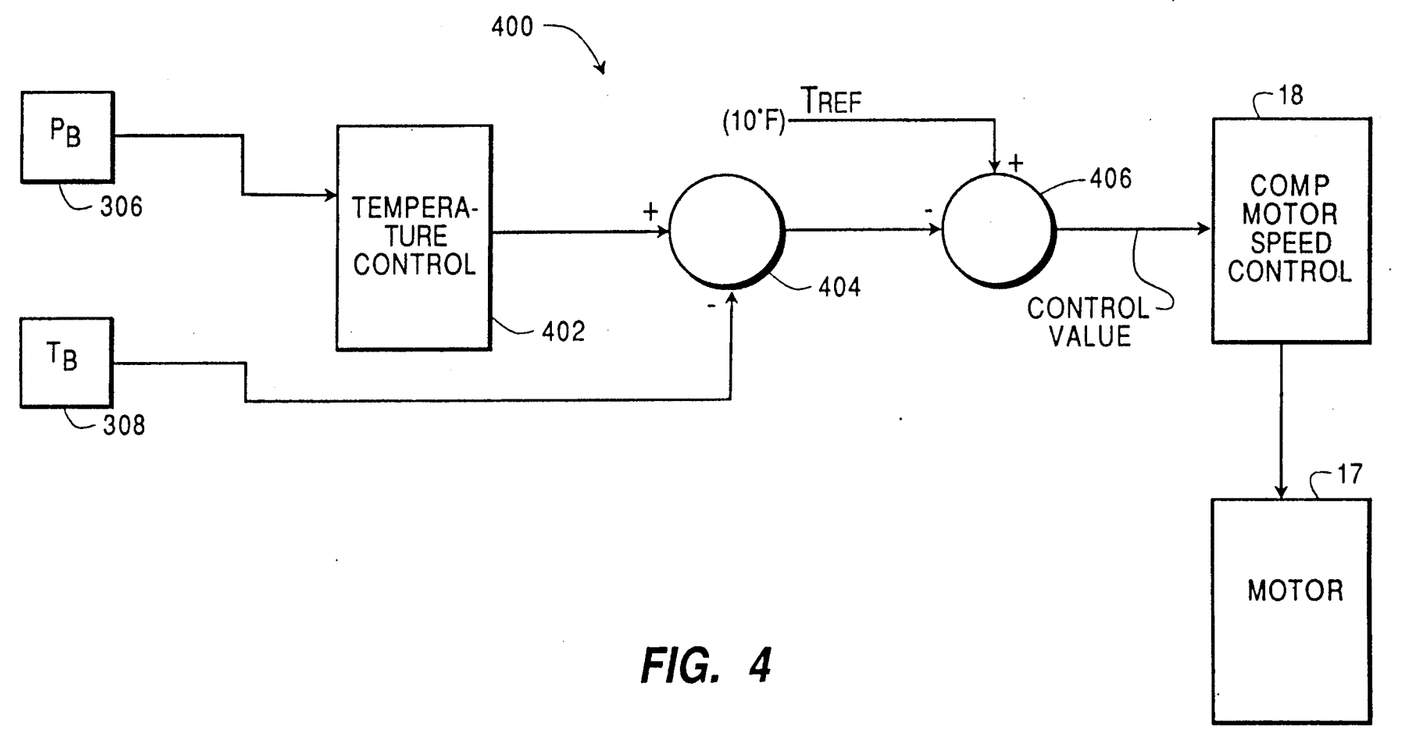
FIG. 4 illustrates a block diagram of a system for controlling the rotational velocity of the compressor rotor of FIG. 3 in accordance with the present invention.

The pressure transducer 302 and the temperature sensor 304 supply signals to a controller as illustrated in FIG. 4 described below. The controller controls the rotational velocity of the motor 17 to reduce the rotational velocity of the rotor 20 when the refrigerant is close to changing from a liquid to a vapor state at which damage or catastrophic failure of the journals of the rotor 20 could occur as a consequence of the high speed rotation of the compressor rotor during normal operation.

FIG. 4 illustrates a block diagram of a protection system for the refrigeration system of FIG. 3 which controls the reduction of the rotational velocity of the rotor 20 to prevent operation of the compressor under conditions in which the refrigerant leaving the hydrodynamic bearings 22 and 24 is subject to changing in state from a liquid to a vapor. Like reference numerals identify like parts in FIGS. 3 and 4. The protection system 400 is responsive to the sensed pressure and temperature provided by the pressure transducer 302 and temperature sensor 304 respectively to control the rotational velocity of the motor 17 to prevent the change in state of the refrigerant flowing from the hydrodynamic bearings 22 and 24 from liquid to vapor. A bubblepoint temperature calculator 402 calculates the bubblepoint temperature of the refrigerant which in the preferred application of FIG. 3 is a non-azeotropic binary refrigerant. A bubblepoint temperature calculator for calculating the bubblepoint temperature of a mixture of binary refrigerants, analogous to the dewpoint calculator disclosed in United States U.S. Pat. application Ser. No. 503,753 entitled "Refrigerant Superheat Calculator" filed on April 3, 1990, which is assigned to the Assignee of the present invention, may be used in calculating the bubblepoint temperature for different molar mixtures of the binary refrigerant. The variation in the bubblepoint temperature may be programmed for different molar mixtures of the non-azeotropic binary refrigerant. For a set mixture of a non-azeotropic binary refrigerant, the bubblepoint as a function of temperature may be programmed by analog programming techniques or stored as a series of values by digital techniques in a manner like that of the foregoing patent application. Alternatively, if a single refrigerant is used or a lubricating fluid is used in practicing the present invention for lubricating the hydrodynamic bearings 22 and 24 which is subject to a change in state from liquid to vapor during lubrication of the hydrodynamic bearings when the rotatable element is rotating, figures published on the refrigerant or lubricant may be used to calculate the bubblepoint temperature as a function of pressure in accordance with procedures known in the art. The calculated bubblepoint temperature produced by the bubblepoint temperature calculator 402 and the sensed temperature of the refrigerant flowing from the hydrodynamic bearings 22 and 24 sensed by the temperature sensor 304 is processed by summer 404 to calculate a difference between the bubblepoint temperature and the temperature of the refrigerant flowing from the bearings. The resultant difference between the bubblepoint temperature and the temperature of refrigerant flowing from the bearings is applied to a summer 406 which calculates a control value equal to the difference between the bubblepoint temperature and the temperature of the refrigerant flowing from the hydrodynamic bearings 22 and 24 and a set reference temperature. The set reference temperature $T_{REF}$ is chosen to provide a margin of safety of the operation of the hydrodynamic bearings. The control value is outputted by the summer 406 to the compressor motor 18.

The compressor motor speed control 18 may be a modification of the motor control disclosed in the aforementioned United States U.S. Pat. application Ser. Nos. 319,719, 319,727 and 320,224. The motor control of the aforementioned patent applications is modified to reduce the commanded rotational speed applied to the motor 17 as a function of a magnitude of the control valve. In a first operational mode, the compressor motor speed control 18 may be turned off whenever the magnitude of the control value from the summer 406 is less than the magnitude of $T_{REF}$ which is representative of the system operating under a circumstance when the refrigerant is too close to changing state from a liquid to a vapor state to maintain full speed operation. Alternatively, the reduction of the rotational velocity by the electric motor may be a linear or non-linear function of the magnitude of the control value with the rotational velocity being zero when the control value is zero or negative and not being reduced when the control value is equal to or greater than the set reference temperature. The choice of whether to totally turn off the compressor motor speed control 18 or to vary the commanded speed as a linear or non-linear function of the magnitude of the control value is determined by the operational characteristics of the refrigeration system. The reduction of the commanded rotational velocity of the motor 17 without totally turning off the compressor motor speed control 18 is preferably when it is desired to maintain precise speed control. Turning off of the compressor motor speed control 18 may result in greater variation in the control of the speed of the rotor 20 than would be produced with a linear or non-linear control which is a function of the magnitude of the control value.

An example of the control of the speed of the rotor 20 as a linear function of the magnitude of the control difference is as follows. The bubblepoint temperature calculator 402 calculates the bubblepoint temperature as being "X° F". The sensed temperature sensed by the temperature sensor 308 is "X − 5° F". The control value is calculated by the summer 406 to be 5° F. The compressor motor speed control is commanded to be half of the maximum speed which would be commanded when the control value is 10° F. or less. During operation of the rotor 20 at the lower speed commanded by the compressor motor speed control 18, the amount of heat absorbed by the refrigerant flowing through the hydrodynamic bearings 22 and 24 decreases which causes the magnitude of the output from the summer 404 to decrease which causes the control value to increase which commands the compressor motor speed control 18 to increase the commanded speed of the motor 17. The control value in this manner is caused to vary to prevent operation of the rotor 20 of the compressor at rotational velocities which cause the temperature of the refrigerant flowing from the hydrodynamic bearings 22 and 24 to be greater than the bubblepoint temperature calculated by the bubblepoint temperature calculator 402 by an amount equal to or greater than the reference temperature $T_{REF}$.

The commanded speed outputted by the compressor motor speed control 18 may be directly proportional to the variation of the magnitude of the control value between zero and the temperature reference $T_{REF}$ or a linear or non-linear function of the control value. When the compressor motor speed control 18 is implemented with the compressor motor speed control 18 of Serial Nos. 319,719, 319,727 and 320,224, the frequency of current applied to the motor 17 is reduced either as a linear or non-linear function of the control value outputted by the summer 406 to cause a corresponding decrease in speed.

A method of protecting the compressor rotor 20 which is rotatably supported by hydrodynamic bearings 22 and 24 pressurized with a refrigerant provided from a pressure source which may be the compressor 12 and/or bearing pump 26 with the refrigerant being subject to change in state from liquid to vapor when heat from the bearings during rotation of the compressor rotor is absorbed by the refrigerant during supporting of the compressor rotor includes sensing the pressure of the refrigerant flowing from the hydrodynamic bearings; sensing the temperature of the fluid flowing from the hydrodynamic bearings; and controlling a rotational velocity of a variable velocity motor 17 which drives the rotatable element as a function of the sensed pressure and temperature to prevent the change in state of the refrigerant flowing through the bearings from liquid to vapor. The refrigerant is preferably a non-azeotropic binary refrigerant. The method further includes calculating a bubblepoint temperature of the refrigerant as a function of the pressure of the refrigerant flowing from the bearings; calculating a difference between the bubblepoint temperature and the temperature of the refrigerant flowing from the bearings; calculating a control value equal to the difference between the bubblepoint temperature and the temperature of the refrigerant flowing from the bearings and a set reference temperature; and reducing the rotational velocity of the rotational velocity of the rotor when the control value is less than a set reference temperature. The reduction of the velocity is a function of a magnitude of the control value with the reduction being turning off of the drive produced by the compressor motor speed control 18 which is applied to the motor 17 or reducing the drive as a linear of non-linear function of a magnitude of the control value.

While the invention has been described in terms of its preferred embodiment, it should be understood that numerous modifications may be made thereto without departing from the spirit and scope of the invention as defined in the appended claims. For example, while the preferred embodiment is disclosed as being a refrigeration system; the invention may be utilized in other applications where rotatable elements are rotatably supported by hydrodynamic bearings which are pressurized by a lubricating fluid which is subject to change in state from a liquid to a vapor during rotation of the rotatable element. It is intended that all such modifications fall within the scope of the appended claims.

I claim:

1. A protection system for a rotatable element which is rotatably supported by hydrodynamic bearings pressurized with a lubricating fluid provided from a pressure source with the fluid being subject to a change in state from liquid to vapor when heat from the bearings during rotation of the rotatable element is absorbed by the pressurized fluid during supporting of the rotatable element comprising:

a pressure sensor in fluid communication with fluid flowing from the hydrodynamic bearings for producing a pressure signal representative of pressure of the fluid flowing from the bearings;

a temperature sensor in fluid communication with fluid flowing from the hydrodynamic bearings for producing a temperature signal representative of temperature of the fluid flowing from the bearings;

a prime mover for driving the rotatable element with a variable rotational velocity; and a controller, responsive to the pressure and temperature signals, for controlling the velocity of the prime mover as a function the pressure and temperature signals to prevent the change in state of the fluid flowing through the bearings from liquid to vapor.

2. A protection system in accordance with claim 1 wherein:

the rotatable element is a rotor of a centrifugal compressor; and the fluid is a refrigerant.

3. A protection system in accordance with claim 2 wherein:

the refrigerant is a non-azeotropic binary

4. A protection system in accordance with claim 3 wherein:

the controller controls the rotational velocity by calculating a bubblepoint temperature of the refrigerant as a function of the pressure of the refrigerant flowing from the hydrodynamic bearings, calculating a difference between the bubblepoint temperature and the temperature of the refrigerant flowing from the bearings, calculating a control value equal to a difference between the difference between the difference between the bubblepoint temperature and the temperature of the refrigerant flowing from the bearings and a set reference temperature and causes the prime mover to reduce the rotational velocity of the rotor when the control value is less than a set reference temperature.

5. A protection system in accordance with claim 4 wherein:
the prime mover is an electric motor which is turned off by the controller when the control value is less than the set reference temperature.

6. A protection system in accordance with claim 4 wherein:
the prime mover is an electric motor; and the reduction of the rotational velocity by the electric motor is a function of a magnitude of the control value.

7. A protection system in accordance with claim 6 wherein:
the reduction of the rotational velocity by the electric motor is a linear function of the magnitude of the control value with the rotational velocity being zero when the control value is zero or negative and not being reduced when the control value is equal to or greater than the set reference temperature.

8. A protection system in accordance with claim 6 wherein:
the reduction of the rotational velocity by the prime mover is a non-linear function of the magnitude of the control value with the rotational velocity being zero when the control value is zero or negative and not being reduced where the control value is equal to or greater than the set reference temperature.

9. A protection system in accordance with claim 2 wherein:
the controller controls the rotational velocity by calculating a bubblepoint temperature of the refrigerant as a function of the pressure of the refrigerant flowing from the hydrodynamic bearings, calculating a difference between the bubblepoint temperature and the temperature of the refrigerant flowing from the bearings, calculating a control value equal to a difference between the difference between the bubblepoint temperature and the temperature of the the refrigerant flowing from the bearings and a set reference temperature and causes the prime mover to reduce the rotational velocity of the rotor when the control value is less than a set reference temperature.

10. A protection system in accordance with claim 9 wherein:
the prime mover is an electric motor which is turned off by the controller when the control value is less than the set reference temperature.

11. A protection system in accordance with claim 9 wherein:
the prime mover is an electric motor; and the reduction of the rotational velocity by the electric motor is a function of a magnitude of the control value.

12. A protection system in accordance with claim 11 wherein:
the reduction of the rotational velocity by the electric motor is a linear function of the magnitude of the control value with the rotational velocity being zero when the control value is zero or negative and not being reduced when the control value is equal to or greater than the set reference temperature.

13. A protection system in accordance with claim 11 wherein:
the reduction of the rotational velocity by the prime mover is a non-linear function of the magnitude of the control value with the rotational velocity being zero when the control value is zero or negative and not being reduced when the control value is equal to or greater than the set reference temperature.

14. A method of protecting a rotatable element which is rotatably supported by hydrodynamic bearings pressurized with a lubricating fluid provided from a pressure source with the fluid being subject to a change in state from liquid to vapor when heat from the bearings during rotation of the rotatable element is absorbed by the pressurized fluid during supporting of the rotatable element comprising:
sensing pressure of the fluid flowing from the hydrodynamic bearings;
sensing temperature of the fluid flowing from the hydrodynamic bearings; and
controlling a rotational velocity of a variable velocity prime mover which drives the rotatable element as a function of the sensed pressure and temperature to prevent the change in state of the fluid flowing through the bearings from liquid to vapor.

15. A method in accordance with claim 14 wherein:
the rotatable element is a rotor of a centrifugal compressor; and
the fluid is a refrigerant.

16. A method in accordance with claim 15 wherein:
the refrigerant is a non-azeotropic binary refrigerant.

17. A method in accordance with claim 16 further comprising:
calculating a bubblepoint temperature of the refrigerant as a function of the pressure of the refrigerant flowing from the bearings;
calculating a difference between the bubblepoint temperature and the temperature of the refrigerant flowing from the bearings;
calculating a control value equal to a difference between the difference between bubblepoint temperature and the temperature of the refrigerant flowing from the bearings and a set reference temperature; and
reducing the rotational velocity of the rotor when the control value is less than a set reference temperature.

18. A method in accordance with claim 17 wherein:
the prime mover is an electric motor which is turned off when the control value is less than the set reference temperature.

19. A method in accordance with claim 17 wherein:
the prime mover is an electric motor; and
the reduction of the rotational velocity by the electric motor is a function of a magnitude of the control value.

20. A method in accordance with claim 19 wherein:
the reduction of the rotational velocity by the electric motor is a linear function of the magnitude of the control value with the rotational velocity being zero when the control value is zero or negative and not being reduced when the control value is equal to or greater than the set reference.

21. A method in accordance with claim 19 wherein:
the reduction of the rotational velocity by the prime mover is a non-linear function of the magnitude of the control value with the rotational velocity being zero when the control value is zero or negative and not being reduced when the control value is equal to or greater than the set reference.

22. A protection system for a rotatable element which is rotatably driven by a prime mover and rotatably supported by hydrodynamic bearings pressurized with a lubricating fluid provided from a pressure source with the fluid being subject to a change in state from liquid to vapor when heat from the bearings during rotation of the rotatable element is absorbed by the pressurized fluid supporting the rotatable element comprising:
   at least one sensor for sensing at least one physical characteristic of the lubricating fluid flowing from the hydrodynamic bearings; and
   a controller, responsive to the at least one sensed physical characteristic of the lubricating fluid, for controlling the rotational velocity of the prime mover as a function of the at least one sensed physical characteristic to prevent the change in state of the fluid flowing through the bearings from liquid to vapor.

23. A protection system in accordance with claim 22 wherein:
   the at least one sensor is a pressure sensor and a temperature sensor;
   the prime mover is an electric motor;
   the lubricating fluid is a refrigerant;
   the rotatable element is a rotor of a centrifugal compressor; and controlled as a function of the bubblepoint of the refrigerant flowing from the bearings.

24. A method of protecting a rotatable element which is rotatably supported by hydrodynamic bearings pressurized with a lubricating fluid provided from a pressure source with the fluid being subject to a change in state from liquid to vapor when heat from the bearings during rotation of the rotatable element is absorbed by the pressurized fluid during supporting of the rotatable element comprising:
   sensing at least one physical characteristic of the fluid flowing from the hydrodynamic bearings; and
   controlling a rotational velocity of a prime mover which drives the rotatable element as a function of the at least one physical characteristic sensed to prevent the change in state of the fluid flowing through the bearings from liquid to vapor.

25. A method in accordance with claim 24 wherein:
   the rotatable element is a rotor of a centrifugal compressor;
   the fluid is a refrigerant;
   the prime mover is an electric motor; and
   the at least one sensed physical characteristic is pressure and temperature of the refrigerant flowing from the bearings.

* * * * *